US012704243B2

(12) United States Patent
Hellenga

(10) Patent No.: US 12,704,243 B2

(45) Date of Patent: Aug. 11, 2026

(54) LIGHTED BRICK CONSTRUCTION SYSTEM

(71) Applicant: Rachel Hellenga, Elmhurst, IL (US)

(72) Inventor: Rachel Hellenga, Elmhurst, IL (US)

(*) Notice: Subject to any disclaimer, the term of this patent is extended or adjusted under 35 U.S.C. 154(b) by 0 days.

(21) Appl. No.: 18/743,100

(22) Filed: Jun. 13, 2024

(65) Prior Publication Data

US 2025/0137630 A1 May 1, 2025

Related U.S. Application Data

(60) Provisional application No. 63/472,774, filed on Jun. 13, 2023.

(51) Int. Cl.

| | |
|---|---|
| ***F21V 23/00*** | (2015.01) |
| ***A63H 33/08*** | (2006.01) |
| ***F21V 5/00*** | (2018.01) |
| ***F21V 17/12*** | (2006.01) |
| ***F21V 21/02*** | (2006.01) |
| ***H05B 47/155*** | (2020.01) |
| ***H05B 47/165*** | (2020.01) |
| *F21Y 105/16* | (2016.01) |
| *F21Y 115/10* | (2016.01) |

(52) U.S. Cl.

CPC ......... *F21V 23/005* (2013.01); *A63H 33/086* (2013.01); *F21V 5/007* (2013.01); *F21V 17/12* (2013.01); *F21V 21/02* (2013.01); *H05B 47/155* (2020.01); *H05B 47/165* (2020.01); *F21Y 2105/16* (2016.08); *F21Y 2115/10* (2016.08)

(58) Field of Classification Search

CPC ........ F21V 23/005; F21V 5/007; F21V 17/12; F21V 21/02; H05B 47/155; H05B 47/165; A63H 33/086

See application file for complete search history.

(56) References Cited

U.S. PATENT DOCUMENTS

| | | | | |
|---|---|---|---|---|
| 2008/0253121 | A1* | 10/2008 | Chien | F21V 14/02 362/249.07 |
| 2011/0141739 | A1* | 6/2011 | Ha | F21S 2/005 362/249.02 |
| 2020/0329868 | A1* | 10/2020 | Mølgaard | A47F 3/001 |
| 2021/0233421 | A1* | 7/2021 | Lee | A63H 33/042 |
| 2022/0034087 | A1* | 2/2022 | Himmler, Sr. | E04B 2/7425 |
| 2023/0006404 | A1* | 1/2023 | Chien | F21V 23/0471 |
| 2024/0163983 | A1* | 5/2024 | Sacek | G09F 9/33 |

* cited by examiner

*Primary Examiner* — Christopher E Dunay

(74) *Attorney, Agent, or Firm* — Sam Pierce

(57) ABSTRACT

A lighted brick construction system comprising: an LED light panel comprising a plurality of individual LEDs arranged in an n*m matrix above a printed circuit board (PCB), the PCB including electronic components necessary for powering the individual LEDs; a frame configured to hold the LED light panel in place, the frame further comprising mounting holes for wall mounting and mating projections for installation; and a plurality of adapters designed with projections that fit into the apertures present in the frame of another system, ensuring secure and stable connection between systems.

22 Claims, 11 Drawing Sheets

LIGHTED BRICK CONSTRUCTION SYSTEM

CROSS-REFERENCE TO RELATED APPLICATIONS

This Application is related to U.S. Provisional Application No. 63/472,774, filed on 13 Jun. 2023, which is incorporated in its entirety by this reference.

TECHNICAL FIELD

This invention relates generally to the field of construction toys and more specifically to a new and useful lighted brick construction system in the field of construction toys.

BACKGROUND OF THE INVENTION

Traditional LEGO® INTERLOCKING TOY CONSTRUCTION BRICKS sets, while colorful and imaginative, often lack the dynamic visual impact that lighting can provide. Without integrated lighting, even the most intricate and detailed LEGO® INTERLOCKING TOY CONSTRUCTION BRICKS models can appear static and less engaging, especially in low-light conditions. This limitation reduces the overall aesthetic appeal of the models, making them less captivating for display purposes.

Moreover, traditional LEGO® INTERLOCKING TOY CONSTRUCTION BRICKS assemblies do not offer the interactive elements that modern users, especially children, find engaging. The lack of lighting effects means that builders cannot experiment with different visual outcomes, limiting the interactive experience. This can result in reduced engagement and interest over time, as users seek more dynamic and interactive building experiences. For LEGO® INTERLOCKING TOY CONSTRUCTION BRICKS models replicating real-world structures, the absence of lighting diminishes realism and functionality. A LEGO® INTERLOCKING TOY CONSTRUCTION BRICKS house without interior lighting or a LEGO® INTERLOCKING TOY CONSTRUCTION BRICKS car without functioning headlights fails to fully capture the essence of its real-world counterpart. This lack of functional illumination limits the usability and authenticity of the models in various scenarios.

Furthermore, traditional LEGO® INTERLOCKING TOY CONSTRUCTION BRICKS sets do not incorporate elements that teach principles of electrical circuits, lighting technology, or design. Without integrated lighting, builders miss out on valuable educational experiences that can enhance their understanding of science and technology. This limits the educational value of LEGO® INTERLOCKING TOY CONSTRUCTION BRICKS building, particularly for young learners. The absence of lighting in LEGO® INTERLOCKING TOY CONSTRUCTION BRICKS sets also restricts builders' ability to customize and enhance their models. Without lighting options, builders cannot experiment with different lighting schemes or create unique visual effects. This constraint limits their creativity and prevents them from pushing the boundaries of their imagination and innovation.

As technology advances and consumer expectations evolve, there is an increasing demand for more feature-rich and advanced LEGO® INTERLOCKING TOY CONSTRUCTION BRICKS sets. Traditional LEGO® INTERLOCKING TOY CONSTRUCTION BRICKS sets, without integrated lighting, do not meet the growing expectations of both casual builders and serious enthusiasts. This gap in the market drives the need for innovative solutions that incorporate modern technologies like LED lighting. Addressing these issues can significantly enhance the LEGO® INTERLOCKING TOY CONSTRUCTION BRICKS building experience, making it more engaging, educational, and visually captivating for users of all ages.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

Figure 1:
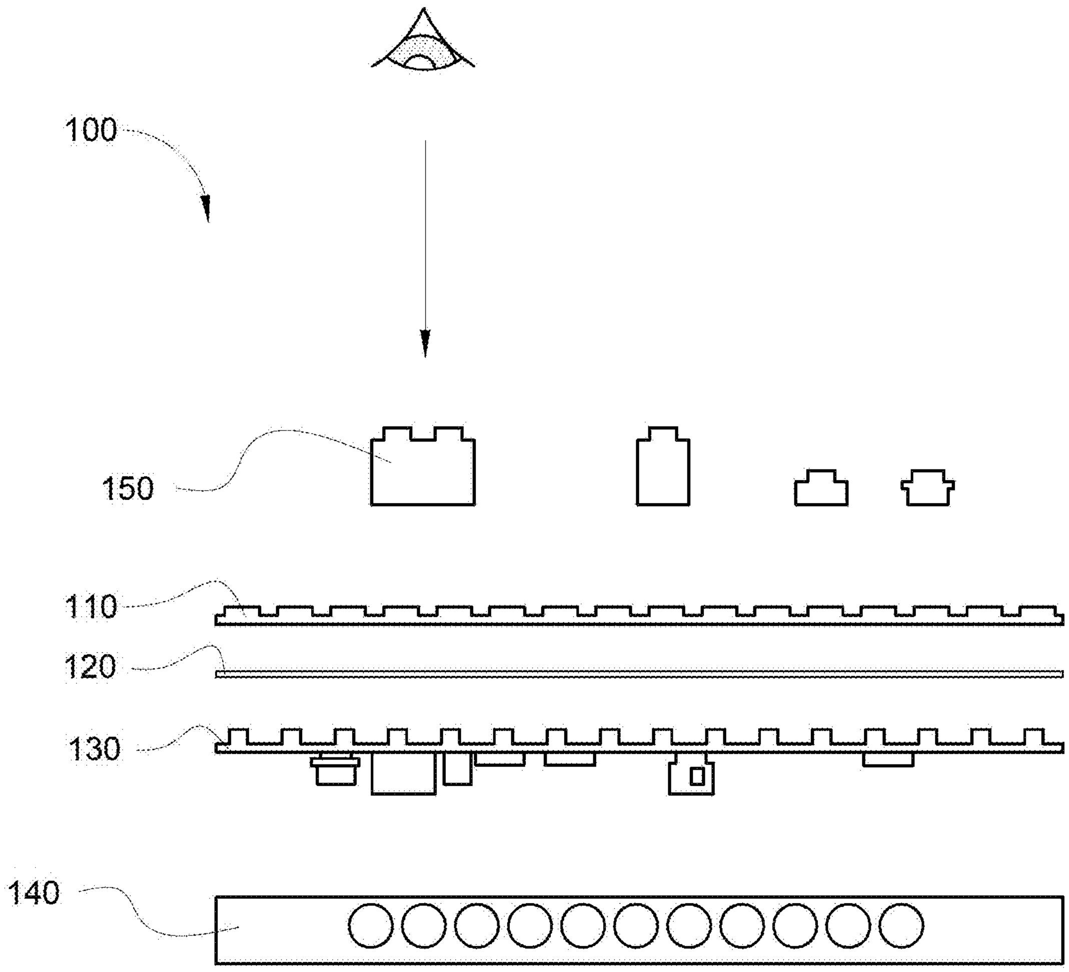
FIG. 1 is an exploded view of the system from side view.
Figure 2:
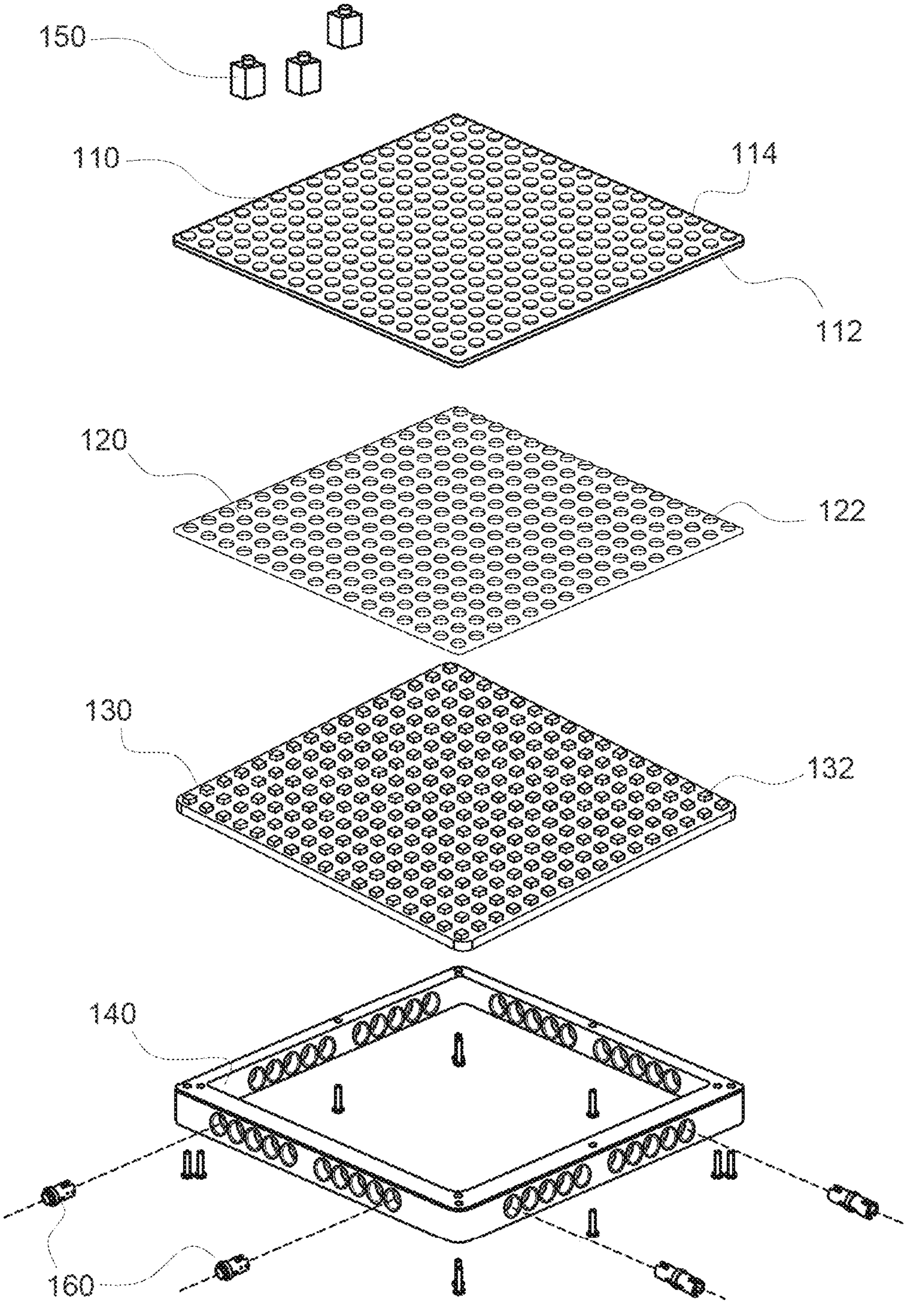
FIG. 2 is an exploded view of the system from perspective view.

According to the first embodiment, as shown in FIG. 1 and FIG. 2, a system 100 includes a face plate 110, a mask 120, a LED light panel 130, a frame 140 and a plurality of LEGO® interlocking toy construction bricks bricks 150 placed above the face plate 110.

The face plate 110 includes a base area 112 and an array of studs 114 arranged along the n*m matrix, where n and m are positive numbers. The studs 114 are offset above the base area 112 and are configured to mate with the corresponding protrusions 154 provided in the LEGO® interlocking toy construction bricks bricks 150. The face plate 110 functions as a build surface for a toy brick building system 100 and is configured to illuminate bricks 150 transiently assembled over this build surface.

The face plate 110 is manufactured from a material that is transparent or translucent to visible light. In one example, the face plate 110 is manufactured from a clear plastic (e.g., acrylonitrile butadiene styrene, high impact polystyrene, Methyl methacrylate-Acrylonitrile-Butadiene-Styrene, thermoplastic polyester), such as via injection molding.

The mask 120 includes an array of apertures 122, arranged in the manner of n*m matrix, where n and m are positive integers. The perforations 122 are configured to mate with the individual LED 132 presents in the LED light panel 132. The mask 120 is configured to be placed above the LED light panel 130 and/or the face plate 110. The mask 120 similarly includes a thin opaque sheet; and apertures 122 configured to seat around studs on the base plateface plate 110 and/or the individual LEDs 152 and configured to block passage of visible light between studs 114—and thus block passage of light from the light panel 120 through interstices between walls of adjacent bricks 150 installed on the face plate 110.

The LED light panel 130 includes a plurality of individual LEDs 132 arranged in n*m matrix above a PCB 134. The PCB 134 comprises electronics components necessary for powering the individual LEDs 132. In one variation, the light panel 130 (or a PCB 134, as described below) is configured: to access and execute a program defining a pattern of activation of light elements, in the array of light elements 132, and to selectively activate a subset of light elements, in the array of light elements 132, based on the program.

For example, the LED light panel 130 can further include a user interface (e.g., touchpad located on the system 100) manipulable by a user to manually activate and deactivate all, groups or, or individual light elements in the array of light elements 132. In the foregoing example in which the light panel 120 includes multiple light elements per stud, the user may interface with the system 100 via the user interface to selectively trigger LED light panel 130 to: activate all center light elements; activate all perimeter light elements; activate all center light and perimeter light elements; or deactivate all center and perimeter light elements.

In another example, the user interface can receive a code associated with a particular shape. For example, the user interface can include a digital touch display or touchpad configured to receive an alphanumeric code—applied to the particular stencil—typed into the user interface by the user. In another example, the user interface includes an optical scanner configured to read a barcode or other identifier applied to the particular stencil when the user passes the stencil over the user interface. The LED light panel 130 (or the PCB 134) then: retrieves a light activation pattern associated with this code—and therefore with the particular stencil; and selectively activates light elements in the LED light panel 130 according to this light activation pattern.

In a similar example, the LED light panel 130 can further include a multi-state switch defining a set of positions for: activating the center light elements and deactivating the perimeter light elements; activating the perimeter light elements and inactivating the center light elements; activating the center light and the perimeter light elements; and/or deactivating the center light elements and the perimeter light elements.

The frame 140 is configured to hold the LED light panel 130 in place. The frame 140 is manufactured from a HDPE material. The frame 140 further comprising mounting holes configured to mount the system 100 on the wall if needed. Further, the frame 140 comprises mating projections configured to install the LED light panel 130.

In one embodiment, the face plate 110 can be intransigently, or permanently installed over the LED light panel 130—such as via heat-staking, adhesive bonding, or threaded fasteners (e.g., screws)—with the array of light elements 132 inserted into apertures in the array of studs 114. Because the face plate 110 is opaque, the face plate 110 can also function as mask 120. The face plate 110 and the mask 120 can therefore be physically coextensive (i.e., on in the same element). The LED light panel 130 and the face plate 110 (and this the mask 120) can thus form a singular integrated light panel.

In another embodiment, the face plate 110 and the LED light panel 130 are intransiently assembled, such as via ultrasonic welding or heat-staking.

In another implementation, the face plate 110 and the LED light panel 130 are transiently assembled. For example, the face plate 110 can include a set of through-holes in the corners of the face plate 110. The LED light panel 130 can include a similar set of threaded bores in the corners of the LED light panel 130. The system 100 can further include a set of threaded fasteners configured: to insert into the through-holes of the face plate 110 and the threaded bores in LED light panel 130; and to transiently assemble the face plate 110 to the LED light panel 130.

In another example, the face plate 110 further includes a set of stud receptacles (e.g., approximating a geometry of an internal volume or underside of a brick) on the rear face of the face plate 110. In this example, the LED light panel 130 can further include a set of retention studs extending outwardly (e.g., from the perimeter of the LED light panel 130). The set of retention studs on the LED light panel 130, can insert into the set of stud receptacles on the face plate 110; and can thus transiently retain the face plate 110 to LED light panel 130.

The face plate 110, the mask 120, the LED panel 130 and the frame 140 in the system 100 can be arranged in a plurality of ways that are discussed below in multiple embodiments.

According to the second embodiment, the system 100 can include a face plate 110, a LED panel 130 and a plastic frame 140.

According to the third embodiment, the mask 120 is integrate with the LED light panel 130. The system 100 comprises a face plate 110, a LED light panel 130 integrated with a mask and a controller. The controller is configured to access a program defining activation of light elements in the array of light elements; and selectively activate light elements, in the array of light elements, according to the program to selectively illuminate the brick installed on the face plate 110.

According to the fourth embodiment, the face plate 110, the mask 120 and the LED light panel can be formed as singular unit.

Referring now to FIG. 2, the system 100 further includes technic pins 160, technic brick 170 and a LEGO® interlocking toy construction bricks structure (not shown). Through the use of technic pins 160, the system 100 can also be attached to other LEGO® interlocking toy construction bricks structures.

Figure 3A:
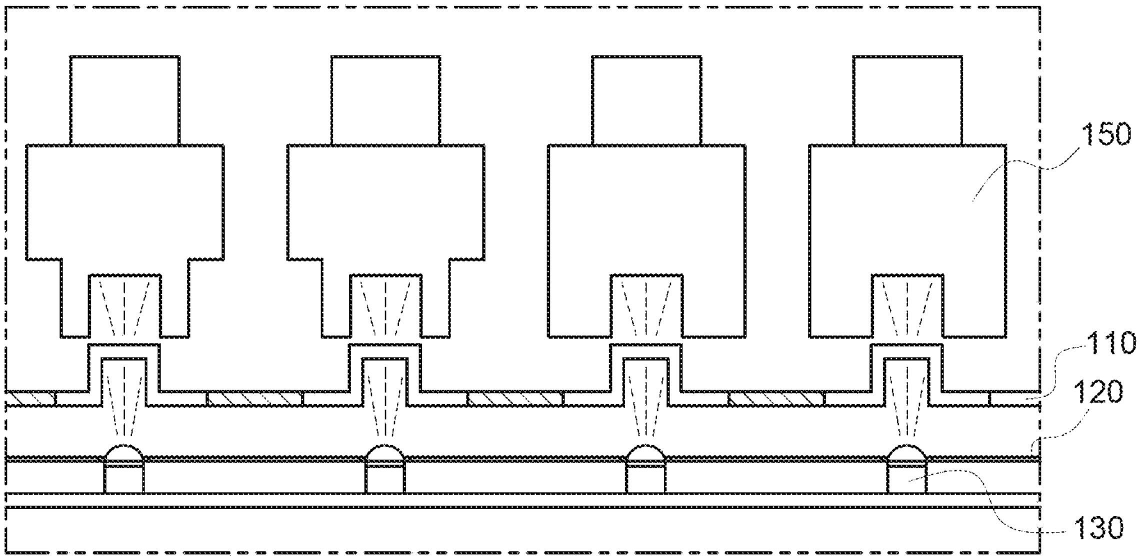
FIG. 3A is an exploded view of the system showing the light passing through various layers.
Figure 3B:
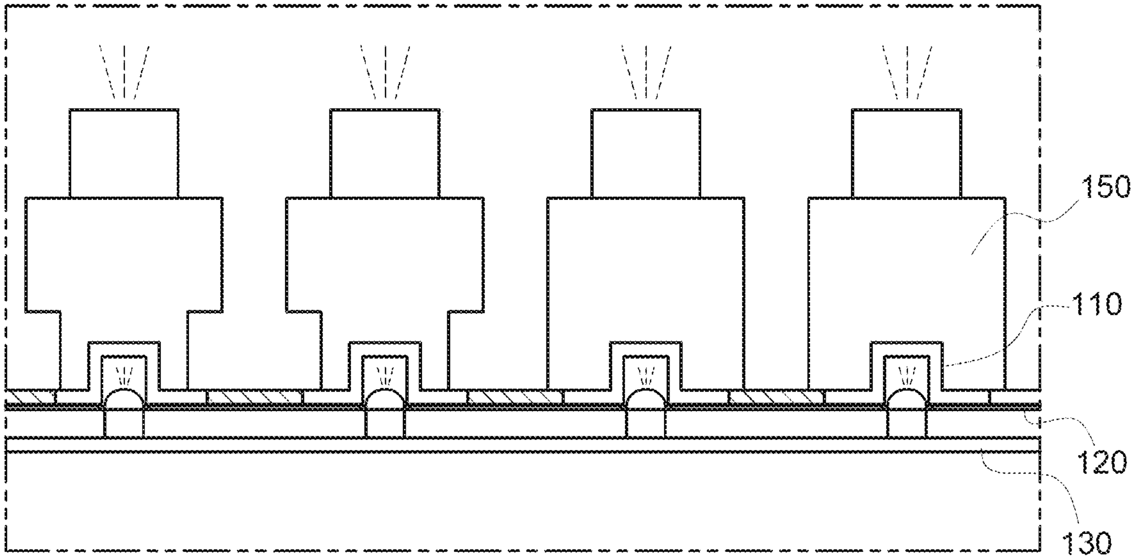
FIG. 3B is an collapsed view of the system showing the light passing through various layers.

Now, with reference to FIG. 3, the application of the system 100 will be explained in greater details.

The system 100 functions as a face plate 110 including a transparent array of studs 114 configured to receive translucent and opaque bricks 150. To illuminate these bricks 150 through studs 114, and/or apertures throught the opaque mask 120. The face plate 110 functions as a build surface for a toy brick building system 100 and is configured to illuminate bricks 150 transiently assembled over this build surface. The mask 120 serves several important functions in the setup. It is made of a thin opaque sheet that prevents visible light from passing through undesired areas, ensuring clean and distinct illumination of individual bricks without any light leakage. The mask has apertures 122 strategically placed to fit around the studs on the base face plate 110, aligning correctly to facilitate effective light management. One of its primary functions is to block light from passing through the spaces between the walls of adjacent bricks 150, preventing light from the LED light panel 130 from bleeding through the gaps and creating a messy lighting effect. While blocking light between the bricks, the mask allows light to pass through the studs into the bodies of the bricks 150. This targeted illumination ensures that each brick is lit uniformly and brightly from within, enhancing the visual appeal of the overall structure.

In one embodiment, each LED light element 132 corresponds to a single stud in the array of studs 114 on the face plate 110. For example, the light panel 120 includes one white light element (e.g., a white LED light) located under each stud—centered and coaxial with the stud, and illuminates the center of the brick 150, creating high levels of internal reflection.

In this example, the system 100 functions as an interactive display in which the lighting panel is arranged behind the base face plate 110 and illuminates walls of bricks 150 installed on studs on the base face plate 110. A mask 130 prevents light—emitted from the light panel 120—from passing between adjacent bricks 150 installed on the base face plate 110.

In another embodiment, the face plate 110 can also be removed from the LED light panel 130, and the face plate 110 and bricks 150 installed thereover can be displayed separately from the LED light panel 130, thereby preserving this build for its user while exposing space on the LED light panel 130 for a second user to place a second base and construct a second image or structure. Later, a user may twist this face plate 110 to dislodge bricks 150 from the face plate 110 and to ready the face plate 110 for reinstallation on the LED light panel 130 and to receive a new assembly of opaque and/or translucent bricks 150.

Additionally, or alternatively, the system 100 can be implemented as small panels, intended for single-day projects with one or more users to build upon. Additionally, these panels can be removed from the wall or LED light panel 130 to be worked upon on the ground to allow for more creativity or comfortability in building, so users are not constrained to standing while using the system 100.

Figure 4:
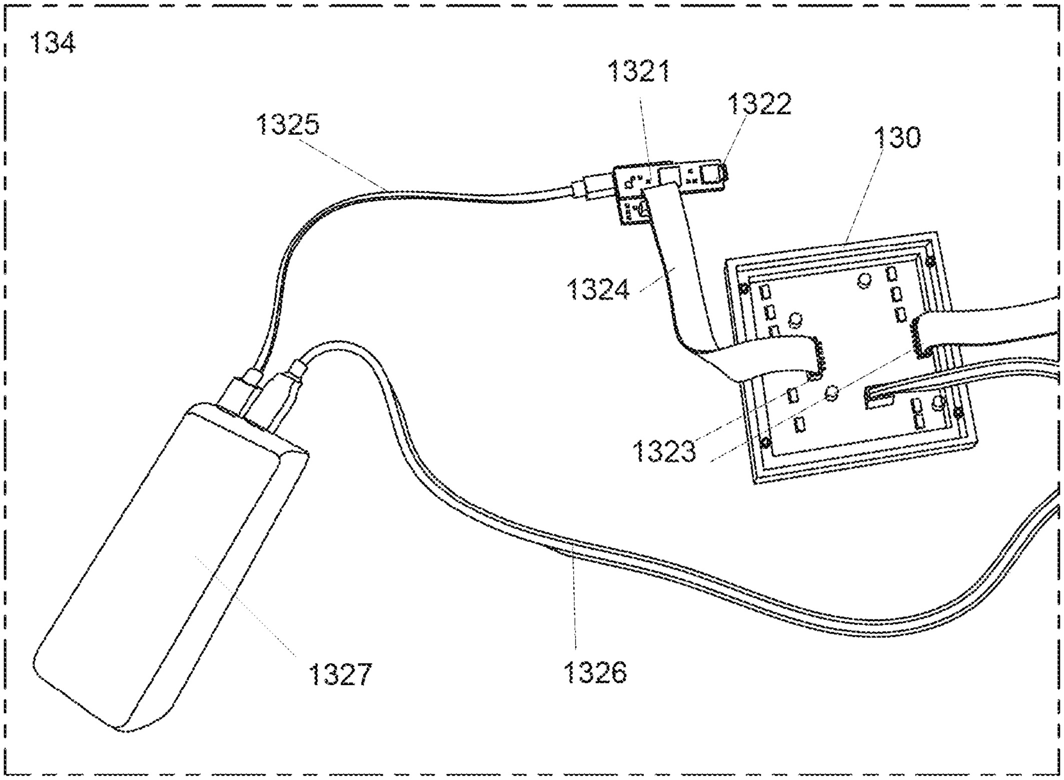
FIG. 4 is a schematic representation of the electronics of one LED light panel.
Figure 5:
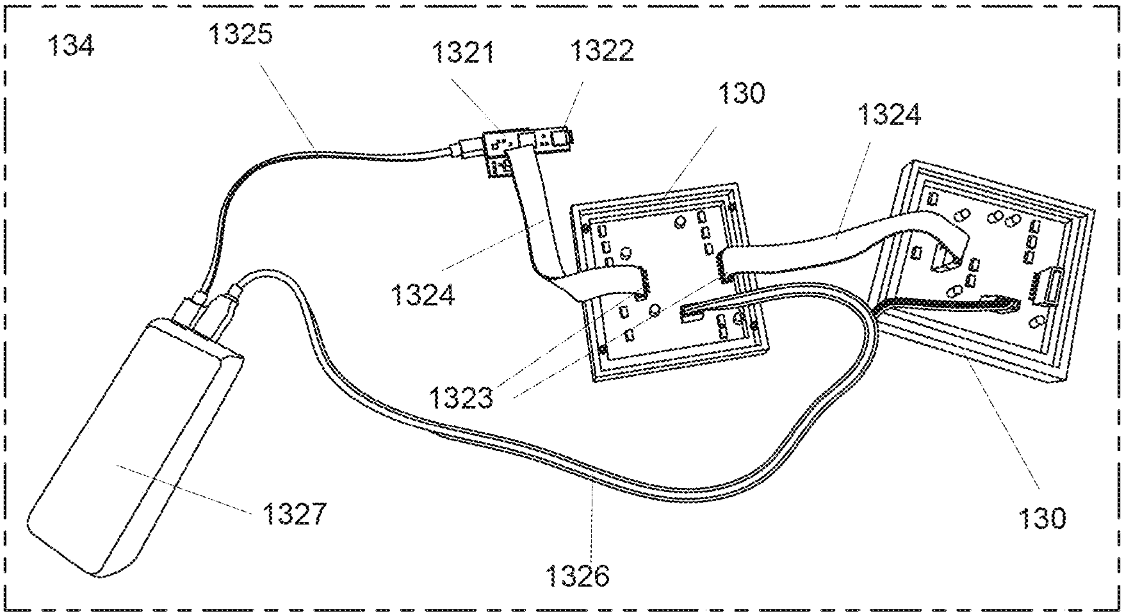
FIG. 5 is a schematic representation of the electronics of two LED light panel joined together.

Referring now to FIG. 4 and FIG. 5, the PCB 134 is a vital component of the LED light panel 130, incorporating several key elements that ensure its optimal functionality and integration within the system. Central to the PCB 134 is the controller 1321, which plays a crucial role in converting instructions into operational commands for the LED panels. This controller is not only capable of processing wired instructions but can also receive instructions wirelessly, adding flexibility and convenience to the system's operation.

Complementing the controller is a memory device 1322, which is embedded within the controller. This memory device is essential for storing data and instructions, allowing the system to access and execute pre-programmed lighting patterns and functions.

The PCB 134 also includes a connection module 1323, which serves multiple purposes. It facilitates internal connections within the LED light panel 130 and also enables communication with other video panels, thereby enhancing the system's versatility and ability to integrate with larger setups.

Communication between the controller and the LED light panel is established through cable 1324, ensuring that commands and data are accurately transmitted. Additionally, cable 1325 is designated for powering the controller, while cable 1326 supplies power directly to the LED light panel, ensuring that both components receive the necessary electrical support to function effectively.

To supply power to the entire system, a power adapter 1327 is included. This adapter ensures that a stable and consistent power supply is provided, which is critical for maintaining the reliability and performance of the LED light panel.

Figure 6:
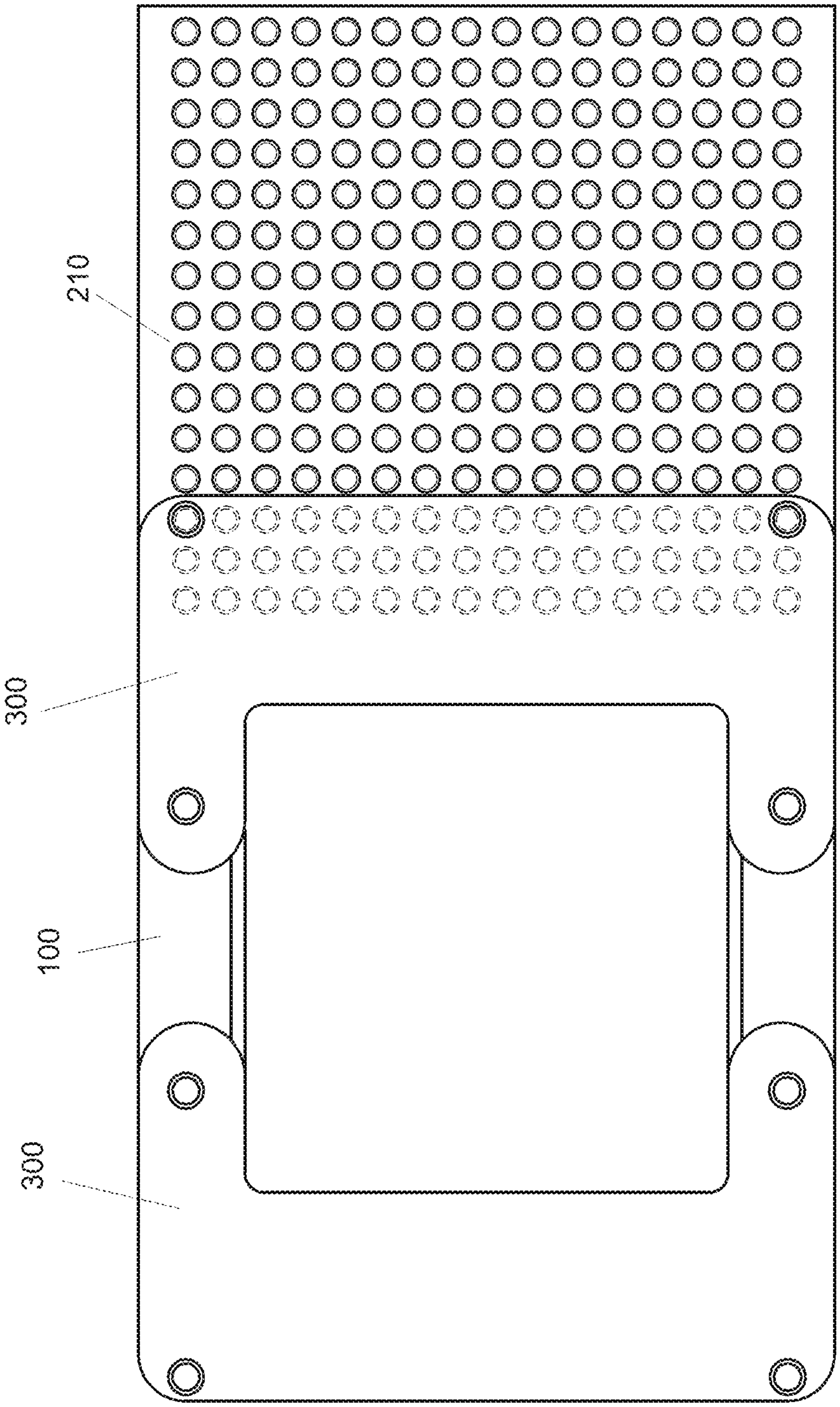
FIG. 6 is a top view of the system with an adapter.
Figure 7:
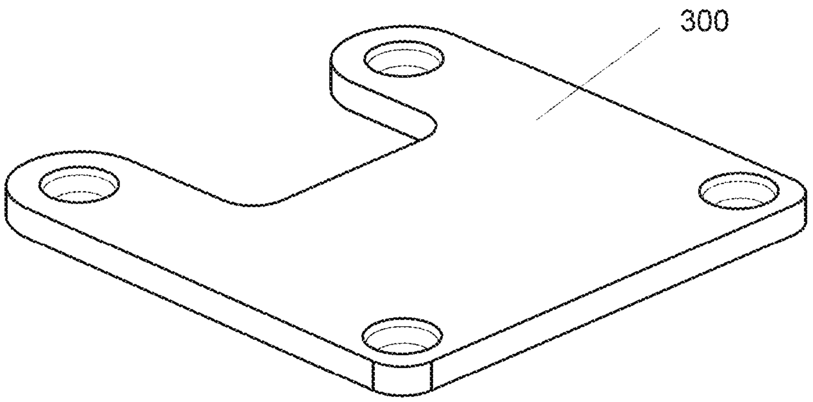
FIG. 7 is a perspective view of the adapter.

Referring now to FIG. 6 and FIG. 7 the system 100 is connected to the face plate 210 of a different system through a series of adapters 300. These adapters play a crucial role in linking the two systems. Each adapter 300 is designed with a plurality of projections that are precisely configured to fit into the apertures present in the frame 140 of system 100 and the face plate 210. This ensures a secure and stable connection between the two systems.

The projections on the adapters 300 are engineered to align perfectly with the corresponding apertures, facilitating easy assembly and disassembly. This design not only provides mechanical stability but also ensures accurate alignment of the systems, which is essential for maintaining the integrity and functionality of the connected systems. The adapters 300 effectively bridge the gap between system 100 and the face plate 210, allowing them to function as a unified entity.

Furthermore, the use of adapters 300 enhances the versatility and modularity of the systems. It allows for easy integration and compatibility between different systems, making it possible to expand or modify the setup as needed without significant changes to the existing components. This adaptability is particularly valuable in dynamic environments where system requirements may change over time.

In one embodiment, these adapters are crafted from 30 mil laminated Teslin, measuring 64×64 mm. They feature holes of 3 mm, 4.8 mm, and 7.8 mm arranged in an 8 mm grid on one half, while the opposite half has specifically located holes of 3 mm and 5 mm. These holes align with and match the sizes of threaded inserts on three standard video wall panels with LED pitches of 2 mm, 4 mm, and 8 mm.

In another embodiment, the adapters 300 include 10 mil laminated Teslin cards that are flexible and can bend, forming a hinge when multiple boards are used. This hinge feature enhances the modularity and adaptability of the system, making it easier to configure and reconfigure as needed.

Furthermore, in another embodiment, the adapters 300 incorporate gold-coated conductive Technic pins. These pins can transfer power and ground from a single data base, eliminating the need for point-to-point connections and improving the overall efficiency and reliability of the power distribution within the system.

When multiple boards are used, the adapters 300 can also be used as a hinge, which significantly enhances the modularity and adaptability of the system. This hinge feature allows the connected boards to pivot relative to each other, providing flexibility in the system's configuration. As a result, users can easily adjust the arrangement of the boards to suit various spatial and functional requirements. This capability is particularly useful in dynamic environments where the setup may need to be frequently changed or updated. The hinge feature simplifies the process of reconfiguring the system. Instead of disassembling and reassembling the entire setup, users can simply pivot the hinged boards to the desired position. This reduces the time and effort required for modifications, making the system more user-friendly and efficient.

In addition to forming hinges, the adapters 300 can also be used to create right-angle joints between the systems. This adds another layer of versatility to the system, allowing it to be assembled in a variety of shapes and orientations. Right-angle joints are essential for creating stable and rigid structures, especially when the system needs to fit into specific spaces or support certain loads.

Referring now to FIG. 8-10, a new embodiment showing variations in face plate is explained in greater details. The face plate 110 described above can be used as wall, ceiling or a floor.

Figure 8A:
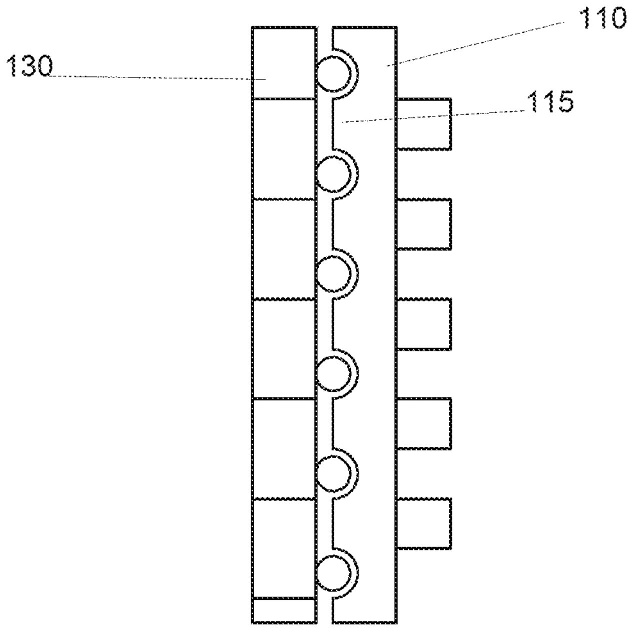
FIG. 8A is a schematic representation of an embodiment of the face plate as floor is side view.
Figure 8B:
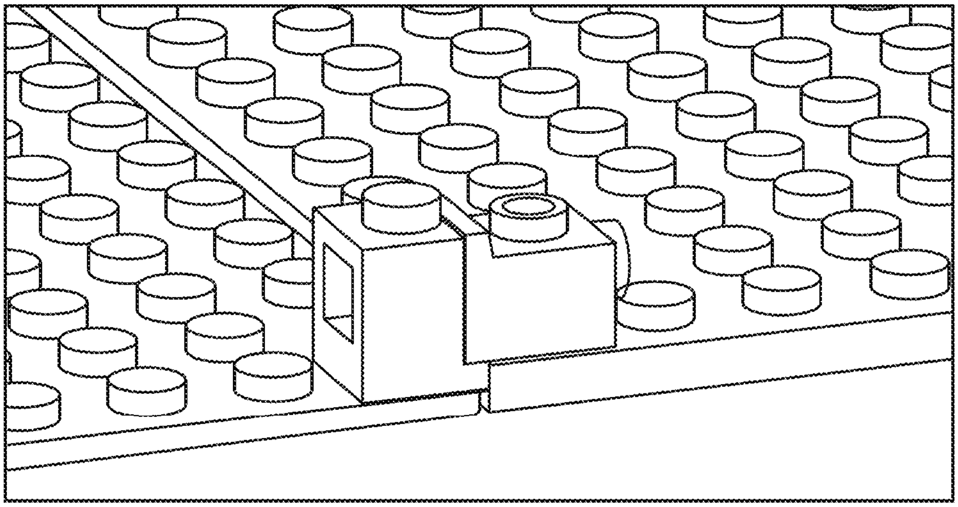
FIG. 8B is a schematic representation of an embodiment of the face plate as floor is perspective view.

As shown in FIGS. 8*a* and 8*b*, the floor plate 110 is used as a floor. The face plate 110 comprises a clear plastic 115 surface designed with precision to facilitate the integration of LED light panels 130 into LEGO® INTERLOCKING TOY CONSTRUCTION BRICKS constructions. This clear plastic surface serves as a foundational base or interface that is equipped with strategically positioned studs, which are the small, raised bumps commonly found on LEGO® INTERLOCKING TOY CONSTRUCTION BRICKS pieces. These studs are not randomly placed; instead, they are located in key positions that align perfectly with the connection points on TECHNIC bricks. The primary purpose of this setup is to integrate LED panels seamlessly into LEGO® INTERLOCKING TOY CONSTRUCTION BRICKS structures. The clear plastic surface 115 ensures that the LED lights are visible while providing a sturdy base for the bricks. When TECHNIC bricks are attached to the studs on this surface 112, they form a wall or other structural element that incorporates the LED panel. This integration allows the LED lights to shine through the clear plastic, illuminating the LEGO® INTERLOCKING TOY CONSTRUCTION BRICKS construction from within. The clear plastic surface 115 with its strategically positioned studs thus serves multiple functions. It acts as a support structure for the TECHNIC bricks, ensuring they remain securely in place. It also facilitates the transmission of light from the LED panel, creating a visually striking effect as the light illuminates the LEGO® INTERLOCKING TOY CONSTRUCTION BRICKS construction. This setup combines the mechanical stability provided by the studs with the aesthetic enhancement offered by the LED lighting, resulting in a more dynamic and engaging LEGO® INTERLOCKING TOY CONSTRUCTION BRICKS build.

Figure 9A:
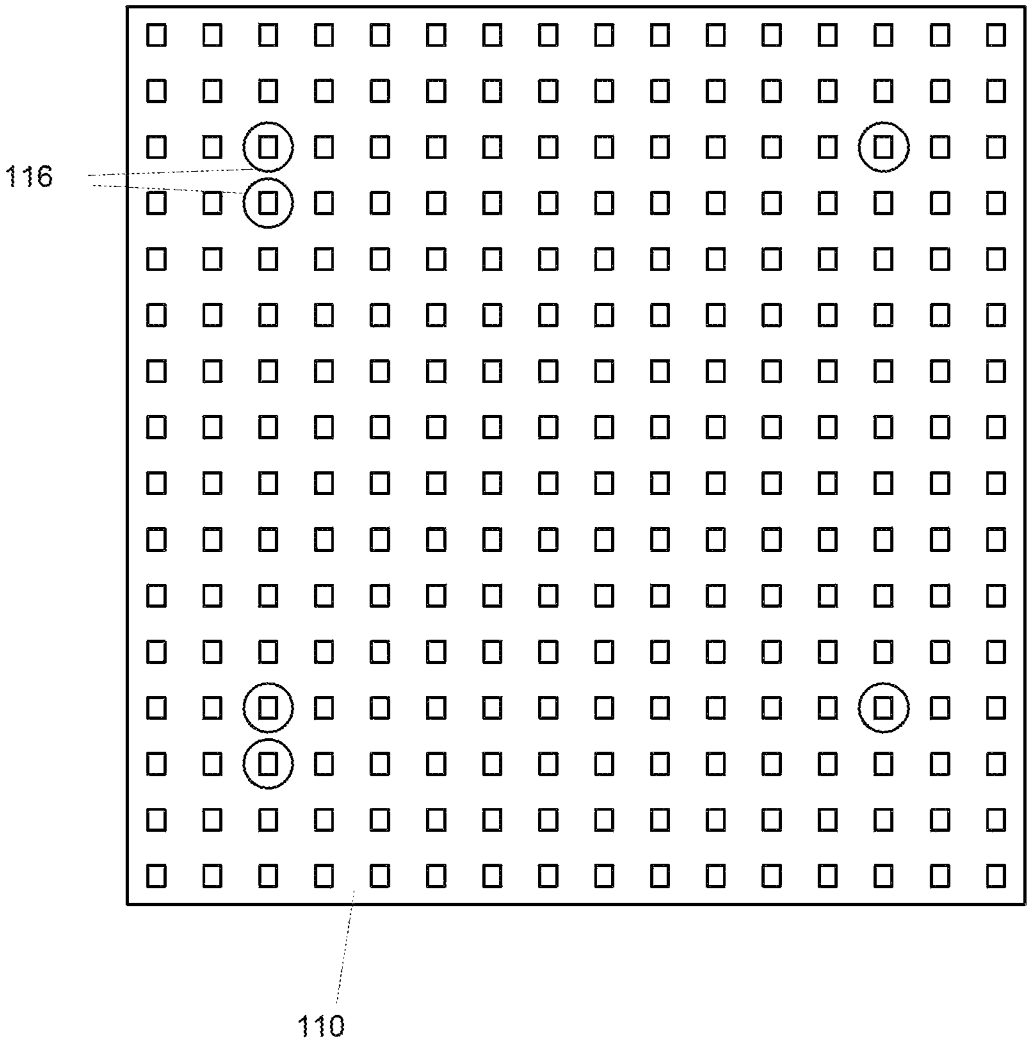
FIG. 9A is a schematic representation of an embodiment of the face plate as wall in side view.
Figure 9B:
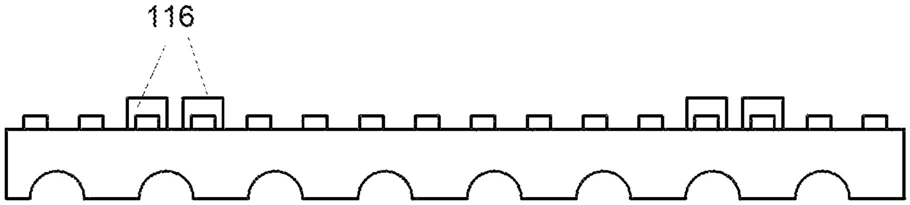
FIG. 9B is a schematic representation of an embodiment of the face plate as wall in top view.

As shown in FIGS. 9*a* and 9*b*, the floor plate 110 is used as a ceiling. The faceplate 110 is specifically designed to attach to an LED panel installed as a ceiling within a LEGO® INTERLOCKING TOY CONSTRUCTION BRICKS construction. The face plate 110 features an anti-stud pattern 116. The anti-stud pattern 116 consists of the underside of LEGO® INTERLOCKING TOY CONSTRUCTION BRICKS bricks, which are hollow and designed to snap onto the studs of other bricks or surfaces. This configuration allows the face plate to securely attach to the studs on the LED panel, effectively anchoring the panel as the ceiling of the LEGO® INTERLOCKING TOY CONSTRUCTION BRICKS structure. The anti-stud pattern 116 ensures a snug fit, providing stability to the LED panel while maintaining the modular and customizable nature of the LEGO® INTERLOCKING TOY CONSTRUCTION BRICKS assembly. This design facilitates the seamless integration of the LED panel into the construction, enhancing the functionality and visual appeal of the LEGO® INTERLOCKING TOY CONSTRUCTION BRICKS model by providing illuminated ceilings.

Figure 10A:
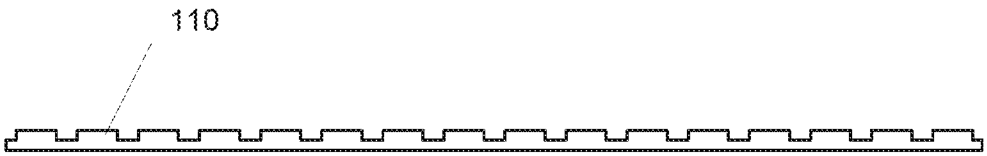
FIG. 10A is a schematic representation of an embodiment of the face plate as ceiling in side view.
Figure 10B:
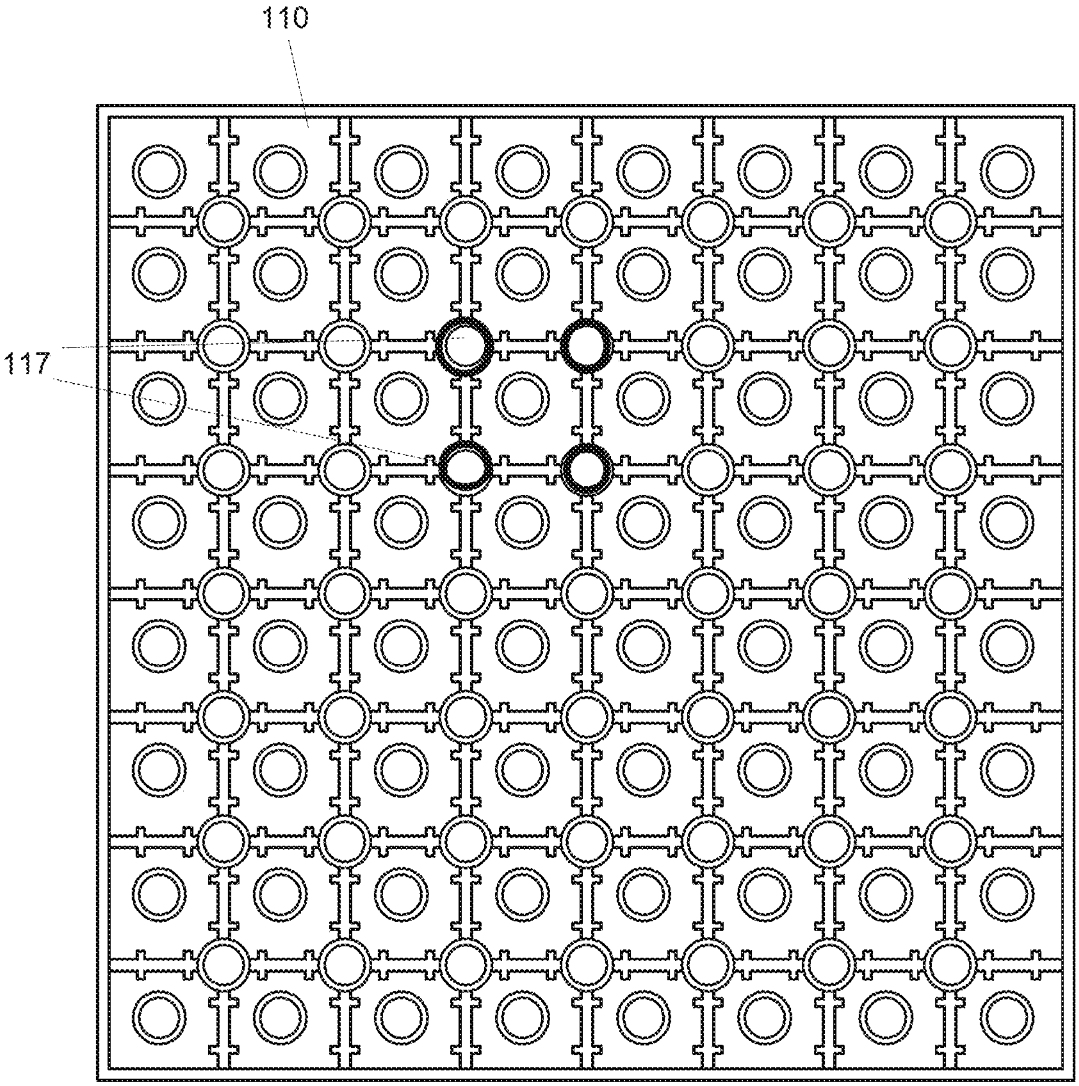
FIG. 10B is a schematic representation of an embodiment of the face plate as ceiling in top view.

As shown in FIGS. 10*a* and 10*b*, the face plate 110 is used as a wall. The face plate 110 comprises unique configuration of positionable and separable studs 117. Unlike traditional LEGO® INTERLOCKING TOY CONSTRUCTION BRICKS face plates with fixed studs, this face plate allows for greater customization and flexibility. The studs on Face plate 110 can be adjusted to different positions and can be separated as needed, providing user with the ability to create tailored configurations that suit their specific design requirements. The positionable and separable studs 117 ensure a secure connection for the LEGO® INTERLOCKING TOY CONSTRUCTION BRICKS bricks while allowing for easy modifications and reconfigurations.

Figure 11:
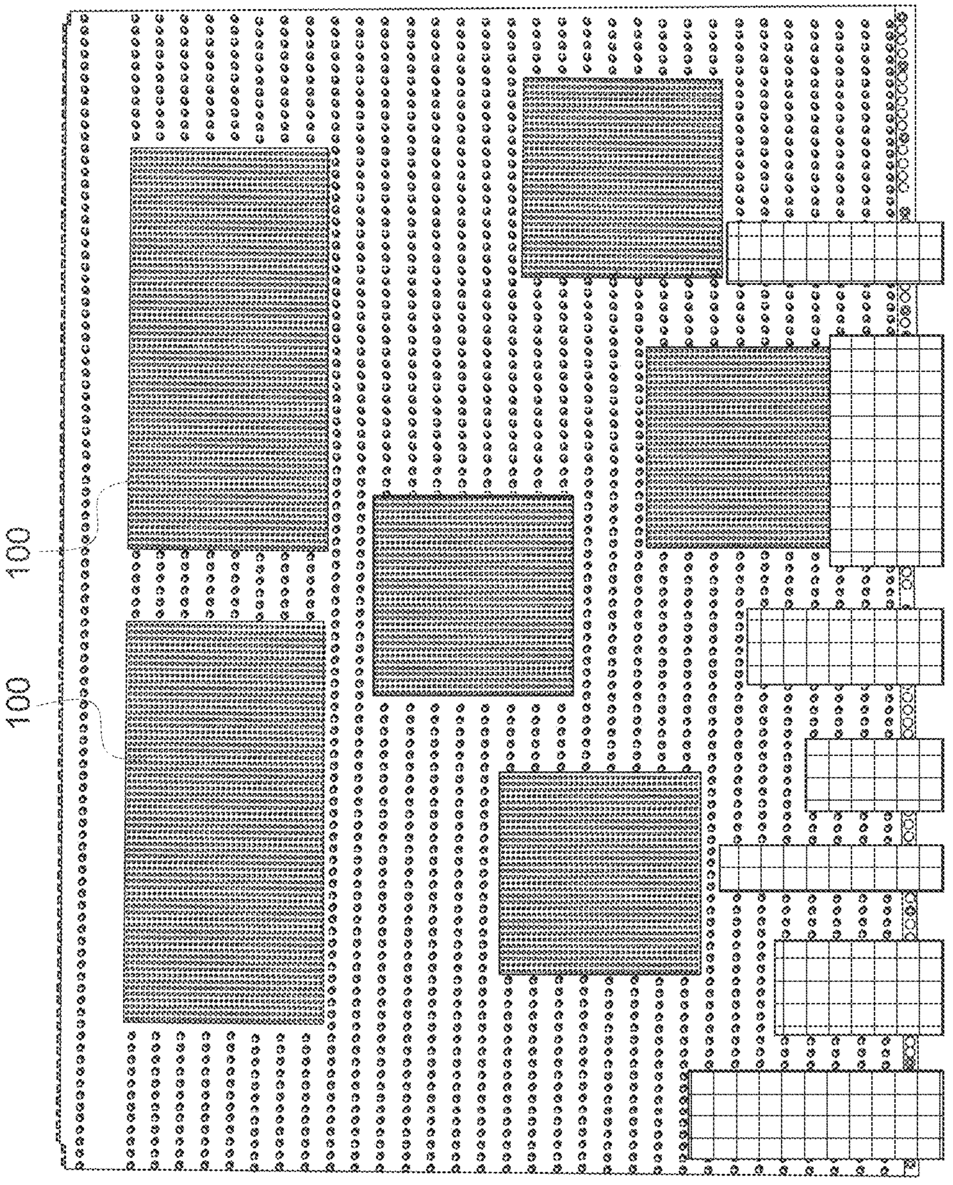
FIG. 11 is a schematic representation of an embodiment of the LED light panel assembled with LEGO® INTERLOCKING TOY CONSTRUCTION BRICKSs.

Referring now to FIG. 11, a plurality system 100 are installed in a LEGO® interlocking toy construction bricks assembly. The user interface discussed in previous embodiments, allows the user to control the system 100 and project various emission of the lighted brick system 100. The lighted brick system can be used to show various lighting features associated with the LEGO® interlocking toy construction bricks assembly needs.

The foregoing description and accompanying figures illustrate the principles, embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A lighted brick construction system comprising:

an LED light panel comprising a plurality of individual LEDs arranged in an n*m matrix above a printed circuit board (PCB), the PCB including electronic components necessary for powering the individual LEDs;

a frame configured to hold the LED light panel in place, the frame further comprising mounting holes for wall mounting and mating projections for installation; and a plurality of adapters designed with projections, having through-holes that fit over the mounting holes present in the frame of another system, ensuring secure and stable connection between systems;

further comprising a face plate including a base area and an array of studs arranged in an n*m matrix, where n and m are positive integers, the studs configured to mate with elements of an interlocking toy brick construction system.

2. The lighted brick construction system of claim 1, wherein the face plate is manufactured from a transparent or translucent material such as acrylonitrile butadiene styrene, high impact polystyrene, or thermoplastic polyester.

3. The lighted brick construction system of claim 1, further comprising a mask positioned above the LED light panel and/or the face plate, the mask comprising a thin opaque sheet with orifices configured to seat around the studs on the face plate and the individual LEDs, the mask designed to disguise the joints between LED panels and unused threaded inserts on the panels.

4. The lighted brick construction system of claim 3, wherein the mask is configured to allow light to pass through the studs and into the bodies of the bricks, providing uniform illumination from within the bricks.

5. The lighted brick construction system of claim 3, wherein the mask is designed to block light from the LED light panel from passing between adjacent interlocking toy bricks, thereby preventing light bleed.

6. The lighted brick construction system of claim 1, wherein the LED light panel includes a user interface manipulable by a user to manually activate and deactivate all, groups, or individual light elements in the array of LEDs.

7. The lighted brick construction system of claim 1, wherein the LED light panel is capable of executing a program defining a pattern of activation of the LEDs, and selectively activates subsets of LEDs based on the program.

8. The lighted brick construction system of claim 1, wherein the frame is made from a high-density polyethylene (HDPE) material.

9. The lighted brick construction system of claim 1, wherein the face plate and the LED light panel are assembled via heat-staking, adhesive bonding, or threaded fasteners.

10. The lighted brick construction system of claim 1, wherein the face plate further includes a set of through-holes at its corners, and the LED light panel includes a corresponding set of threaded bores, enabling the face plate to be transiently assembled to the LED light panel using threaded fasteners.

11. The lighted brick construction system of claim 1, the face plate and the LED light panel can be permanently installed via methods such as heat-staking, adhesive bonding, or threaded fasteners.

12. The lighted brick construction system of claim 1, wherein the face plate and the LED light panel can be transiently assembled using a set of retention studs on the LED light panel and corresponding stud receptacles on the face plate.

13. The lighted brick construction system of claim 1, wherein the face plate functions as both a build surface and an illumination source for elements of an interlocking toy brick construction system assembled over it.

14. The lighted brick construction system of claim 1, wherein the LED light panel can include a multi-state switch for selectively activating different sets of light elements.

15. The lighted brick construction system of claim 1, wherein the face plate further includes a set of stud receptacles on its rear face for transiently retaining the face plate to the LED light panel.

16. The lighted brick construction system of claim 1, wherein the LED light panel is configured to display various light activation patterns based on user input or pre-programmed settings.

17. The lighted brick construction system of claim 1, wherein the frame features counterbored holes to render it easier to connect to an interlocking toy brick construction system through the use of standardized cylindrical connectors designed to mate with injection-molded counterbored holes in plastic interlocking bricks.

18. The lighted brick construction system of claim 17, wherein specifically the addition of countersunk holes makes it possible to insert pins to connect to the system and also makes it possible to insert the half-pins to connect to the traditional brick building system.

19. The lighted brick construction system of claim 18, wherein the countersunk holes also reposition the threaded inserts to align with the building toy system without the need for adapters.

20. The lighted brick construction system of claim 1, wherein the adapters enhance the system's modularity, allowing for easy expansion and reconfiguration of the connected systems.

21. The lighted brick construction system of claim 1, wherein the faceplate has been modified with cavities for the LEDs in order to allow the LED to sit higher up in the brick, because it is in the stud, not behind the stud.

22. The lighted brick construction system of claim 1, wherein the faceplate has been modified with threaded inserts to enable it to attach directly to an LED video panel.

* * * * *